United States Patent
Oh et al.

(10) Patent No.: US 12,439,166 B2
(45) Date of Patent: Oct. 7, 2025

(54) LASER PULSE DECODING USING A SENSOR

(71) Applicant: Microsoft Technology Licensing, LLC, Redmond, WA (US)

(72) Inventors: Minseok Oh, Santa Clara, CA (US); John Peter Godbaz, Sunnyvale, CA (US); Rui Jin, Mountain View, CA (US)

(73) Assignee: Microsoft Technology Licensing, LLC, Redmond, UT (US)

( * ) Notice: Subject to any disclaimer, the term of this patent is extended or adjusted under 35 U.S.C. 154(b) by 166 days.

(21) Appl. No.: 18/386,009

(22) Filed: Nov. 1, 2023

(65) Prior Publication Data

US 2025/0142220 A1    May 1, 2025

(51) Int. Cl.
*H04N 23/73* (2023.01)
*G02B 27/01* (2006.01)
*H04N 23/56* (2023.01)
*H04N 23/68* (2023.01)

(52) U.S. Cl.
CPC ......... *H04N 23/73* (2023.01); *G02B 27/0172* (2013.01); *H04N 23/56* (2023.01); *H04N 23/689* (2023.01)

(58) Field of Classification Search
CPC ...... H04N 23/73; H04N 23/56; H04N 23/689; H04N 23/10; H04N 25/531; H04N 25/532; G02B 27/0172; H04B 10/11
See application file for complete search history.

(56) References Cited

U.S. PATENT DOCUMENTS

| 10,186,301 | B1 * | 1/2019 | van Hoff | H04N 13/271 |
| 11,363,188 | B2 | 6/2022 | Price | |
| 2017/0010618 | A1 * | 1/2017 | Shashua | G01C 21/3644 |
| 2022/0351345 | A1 * | 11/2022 | Price | G06T 5/50 |

OTHER PUBLICATIONS

"IEDM 2021: A Shortwave Infrared Global Shutter Sensor Uses Quantum Dots to Break Records", Retrieved From: https://blog.st.com/iedm-2021/, Dec. 15, 2021, 5 Pages.
Hilton, et al., "High-Definition 1-15 Broad-Band Visible-SWIR Sensors for Laser Mark Detection", vol. 12534, Jun. 13, 2023, 9 pages.
International Search Report and Written Opinion received for PCT Application No. PCT/US2024/052167, (MS# 413757-PCT01) mailed on Feb. 7, 2025, 15 pages.

* cited by examiner

*Primary Examiner* — Twyler L Haskins
*Assistant Examiner* — John H Morehead, III
(74) *Attorney, Agent, or Firm* — Workman Nydegger

(57) ABSTRACT

Techniques for using a sensor to perform laser signal decoding are disclosed. The sensor may be a global shutter sensor or a rolling shutter sensor. The sensor generates a first set of images while operating in a first mode. In response to detecting a laser signal in the first set of images, the sensor is caused to operate in a second mode. The laser signal includes an embedded frequency signal component and repeats at a periodic rate. While the sensor is operating in the second mode, the sensor generates a second set of images, which capture an entire period of the laser signal. From the second set of images, the embedded frequency signal component is determined. A decoding operation is performed using the embedded frequency signal component.

20 Claims, 17 Drawing Sheets

LASER PULSE DECODING USING A SENSOR

BACKGROUND

Short-wave infrared (SWIR) asynchronous laser pulse detection (ALPD) and decoding generally refers to the process of identifying a laser pulse and decoding the frequency signal component embedded in that laser pulse. Historically, the units used to identify (and potentially decode) the laser pulse have been large and power intensive. As one example, the Micro-SWIR 640CSX multi-mode tracking unit has been used. This type of camera/sensor core provided generally high resolution output and decoded multiple sources simultaneously. Often, these units were equipped on large machinery, such as a vehicle. When incorporated as a part of large machinery, power consumption and size often did not matter.

These traditional sensors were also typically comprised of indium gallium arsenide (InGaAs) sensors. This material is quite expensive to manufacture. Similarly, these traditional sensors often had a size of about 31.8 $mm^2$ by 31.8 $mm^2$. The pixel pitch of these sensors was often about 15 um, with the active pixel array being about 640×512. The frame rates for these sensors was often around 30-60 frames per second (FPS). Also, the power consumption was typically around 3 Watts (W). Sometimes, the power consumption would reach about 6.5 W.

Head mounted devices (HMD), or other wearable devices, are becoming highly popular. These types of devices are able to provide a so-called "extended reality" experience.

The phrase "extended reality" (XR) is an umbrella term that collectively describes various different types of immersive platforms. Such immersive platforms include virtual reality (VR) platforms, mixed reality (MR) platforms, and augmented reality (AR) platforms. The XR system provides a "scene" to a user. As used herein, the term "scene" generally refers to any simulated environment (e.g., three-dimensional (3D) or two-dimensional (2D)) that is displayed by an XR system.

For reference, conventional VR systems create completely immersive experiences by restricting their users' views to only virtual environments. This is often achieved through the use of an HMD that completely blocks any view of the real world. Conventional AR systems create an augmented-reality experience by visually presenting virtual objects that are placed in the real world. Conventional MR systems also create an augmented-reality experience by visually presenting virtual objects that are placed in the real world, and those virtual objects are typically able to be interacted with by the user. Furthermore, virtual objects in the context of MR systems can also interact with real world objects. AR and MR platforms can also be implemented using an HMD. XR systems can also be implemented using laptops, handheld devices, and other computing systems.

Unless stated otherwise, the descriptions herein apply equally to all types of XR systems, which include MR systems, VR systems, AR systems, and/or any other similar system capable of displaying virtual content. An XR system can be used to display various different types of information to a user. Some of that information is displayed in the form of a "hologram." As used herein, the term "hologram" generally refers to image content that is displayed by an XR system. In some instances, the hologram can have the appearance of being a 3D object while in other instances the hologram can have the appearance of being a 2D object.

As XR systems become more popular, many of the tasks that were previously performed by large machinery are now being performed by much smaller, wearable equipment. Various challenges arise with this migration, however. For instance, now, size and power consumption parameters are quite relevant with actions performed on an XR system. Therefore, with particular respect to SWIR ALPD systems, there is a substantial need in the field to provide smaller units that use less power.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a computer system including: a processor system; and a storage system that stores instructions that are executable by the processor system to cause the computer system to: use a sensor to generate a first set of images, wherein the sensor is initially operating in a first mode, and wherein the sensor is one of a global shutter sensor or a rolling shutter sensor; in response to detecting a laser signal represented within the first set of images, cause the sensor to operate in a second mode, wherein the laser signal includes an embedded frequency signal component, and wherein the laser signal repeats at a periodic rate; while the sensor is operating in the second mode, cause the sensor to generate a second set of images, wherein a number of images included in the second set of images is set so an entire period of the laser signal is represented within the second set of images; from the second set of images, determine the embedded frequency signal component of the laser signal; and perform a decoding operation using the embedded frequency signal component.

In some aspects, the techniques described herein relate to a method including: using a sensor to generate a first set of images, wherein the sensor is initially operating in a first mode, and wherein the sensor is one of a global shutter sensor or a rolling shutter sensor; in response to detecting a laser signal in the first set of images, causing the sensor to operate in a second mode, wherein the laser signal includes an embedded frequency signal component and repeats at a periodic rate; while the sensor is operating in the second mode, causing the sensor to generate a second set of images, wherein a number of images included in the second set of images is set so as to capture an entire period of the laser signal, which repeats at the periodic rate; from the second set of images, determining the embedded frequency signal component of the laser signal; and performing a decoding operation using the embedded frequency signal component.

In some aspects, the techniques described herein relate to a method including: using a sensor to generate a first set of images, wherein the sensor is initially operating in a first mode, and wherein the sensor is one of a global shutter sensor or a rolling shutter sensor; in response to detecting a laser signal in the first set of images, causing the sensor to operate in a second mode, wherein the laser signal includes an embedded frequency signal component, and wherein the laser signal repeats at a periodic rate; while the sensor is operating in the second mode, causing the sensor to generate a second set of images, wherein a number of images included in the second set of images is set so as to capture an entire period of the laser signal, which repeats at the periodic rate; from the second set of images, determining the embedded frequency signal component of the laser signal; performing a decoding operation using the embedded frequency signal component; and triggering emission of a response laser signal, wherein a response embedded frequency signal component is embedded in the response laser signal, wherein the response laser signal repeats at a second periodic rate, and wherein a content of the embedded frequency signal component is based on the received embedded frequency signal component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
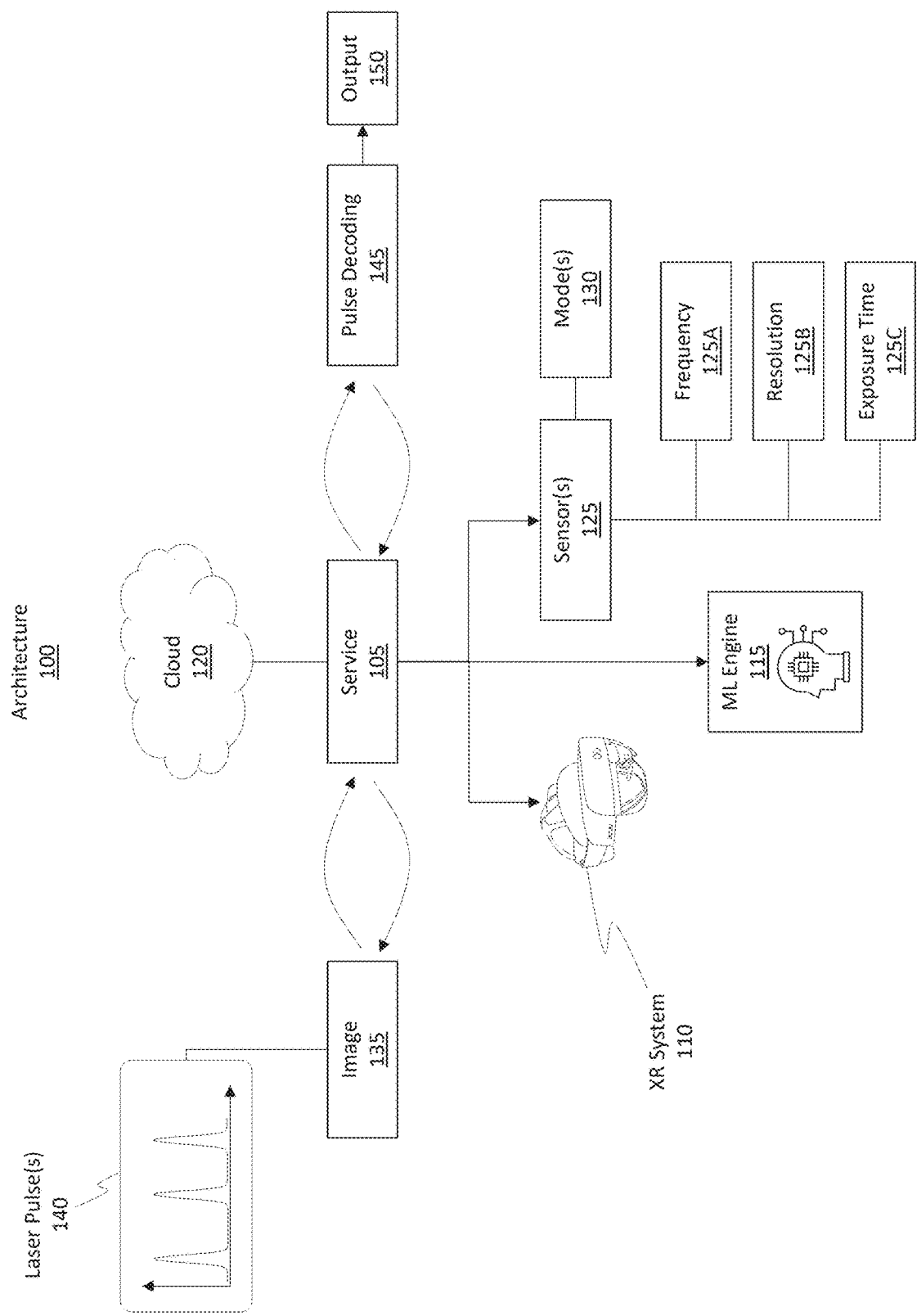
FIG. 1 illustrates an example computing architecture for decoding a laser signal using a global shutter sensor.

As mentioned previously, SWIR ALPD decoding solutions enable a network of systems to transmit information amongst themselves. Existing SWIR ALPD decoding solutions are mostly based on both InGaAs photodiode processes and per-pixel high-speed analog-to-digital converters or time-to-digital converters, which make the camera system expensive. These traditional units have also required a relatively high amount of power consumption and also required relatively large pixel sizes (e.g., either low resolution or large form-factor). Historically, SWIR ALPD solutions have been used only on large machines, such as vehicles.

The disclosed embodiments improve the existing technology by enabling the use of a relatively cheap and small form-factor SWIR ALPD solution, such as a colloidal quantum dot (CQD) sensor. These improvements are achieved through the use of a SWIR global shutter image sensor that can be incorporated on a wearable device, such as an HMD of an XR system. It should be noted how the disclosed principles can be employed by any type of portable or wearable device, though a majority of the examples provided herein are directed to an HMD type of wearable device.

It should be noted that while a majority of this disclosure focuses on the use of a global shutter sensor, the disclosed principles are not limited to the use of only a global shutter sensor. Indeed, other sensor types can also be used. As one example, a rolling shutter sensor can also be used and should be included within the scope of this disclosure. Thus, throughout this disclosure, when reference is made to a global shutter sensor, it should be appreciated how the corresponding details can also be applied to a rolling shutter sensor. That is, the process flows outlined for the global shutter type of sensor (e.g., one example being in FIG. 8) can equally be applied to a rolling shutter type of sensor. It should also be noted how any potential motion artifacts that may arise as a result of using a rolling shutter can be mitigated or compensated via image signal processing using inertial measurement unit (IMU) data.

By following the disclosed principles, the embodiments now enable the performance of SWIR ALPD operations on an HMD. Similarly, the embodiments improve the performance of the HMD by incorporating the use of an improved sensor that has a smaller dimensional footprint than traditional sensors, is cheaper than traditional sensors, has a smaller pixel pitch, has a higher resolution active pixel array, has a similar or improved frame rate, and uses less power.

The embodiments also improve processes involved with performing cross platform pointing laser receiver (CPPLR) scenarios. CPPLR is a particular subset of SWIR ALPD technologies, and CPPLR can be supported by the disclosed embodiments. As mentioned previously, a laser pulse is configured to include an embedded frequency signal, which can include data that one platform is to transmit to another platform. The laser pulse has a relatively short duty cycle. The laser pulse originates at one HMD and is aimed at another HMD. The receiving HMD captures multiple images of the laser pulse and analyzes the frequency characteristics of that pulse.

The traditional sensor, which was not used on an HMD, uses a full waveform analyzer for each pixel of the sensor (e.g., a high speed digitizer). That is, each pixel measures the waveform of the laser pulse using an analog-to-digital converter (ADC). The frequency can be obtained or extracted using a fast Fourier transform. One can appreciate how these components cause the traditional sensor to be quite large. The disclosed embodiments, on the other hand, are able to compact the size of the sensor and improve its power performance (e.g., consumption is now about 100 mW) while still achieving the same results of extracting the embedded signal. The embodiments are beneficially able to incorporate these improved sensors on an HMD.

The HMD can then use the frequency to perform a decoding operation (using a selected resolution) to extract the embedded signal. In this manner, the two HMDs (or more generally platforms) can transmit information to each other in a covert and secure manner. The embodiments improve how these platforms (e.g., HMDs) are able to communicate by improving the sensor that is used by the HMD and by improving the various operations associated with receiving, analyzing, and decoding a signal. Accordingly, these and numerous other benefits will now be described in more detail throughout the remaining sections of this disclosure.

Example Architecture

Having just described some of the high level benefits, advantages, and practical applications achieved by the disclosed embodiments, attention will now be directed to FIG. 1, which illustrates an example computing architecture 100 that can be used to achieve those benefits.

Architecture 100 includes a service 105, which can be implemented by an XR system 110 comprising an HMD. As used herein, the phrases XR system, HMD, platform, or wearable device can all be used interchangeably and generally refer to a type of system that displays holographic content (i.e. holograms). In some cases, XR system 110 is of a type that allows a user to see various portions of the real world and that also displays virtualized content in the form of holograms. That ability means XR system 110 is able to provide so-called "passthrough images" to the user. It is typically the case that architecture 100 is implemented on an MR or AR system, though it can also be implemented in a VR system.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine, such as ML engine 115. The ML engine 115 enables the service to operate even when faced with a randomization factor.

As used herein, reference to any type of machine learning or artificial intelligence may include any type of machine learning algorithm or device, convolutional neural network (s), multilayer neural network(s), recursive neural network (s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud 120 environment. In some implementations, service 105 is a local service operating on a local device, such as the XR system 110. In some implementations, service 105 is a hybrid service that includes a cloud component operating in the cloud 120 and a local component operating on a local device. These two components can communicate with one another.

Figure 2:
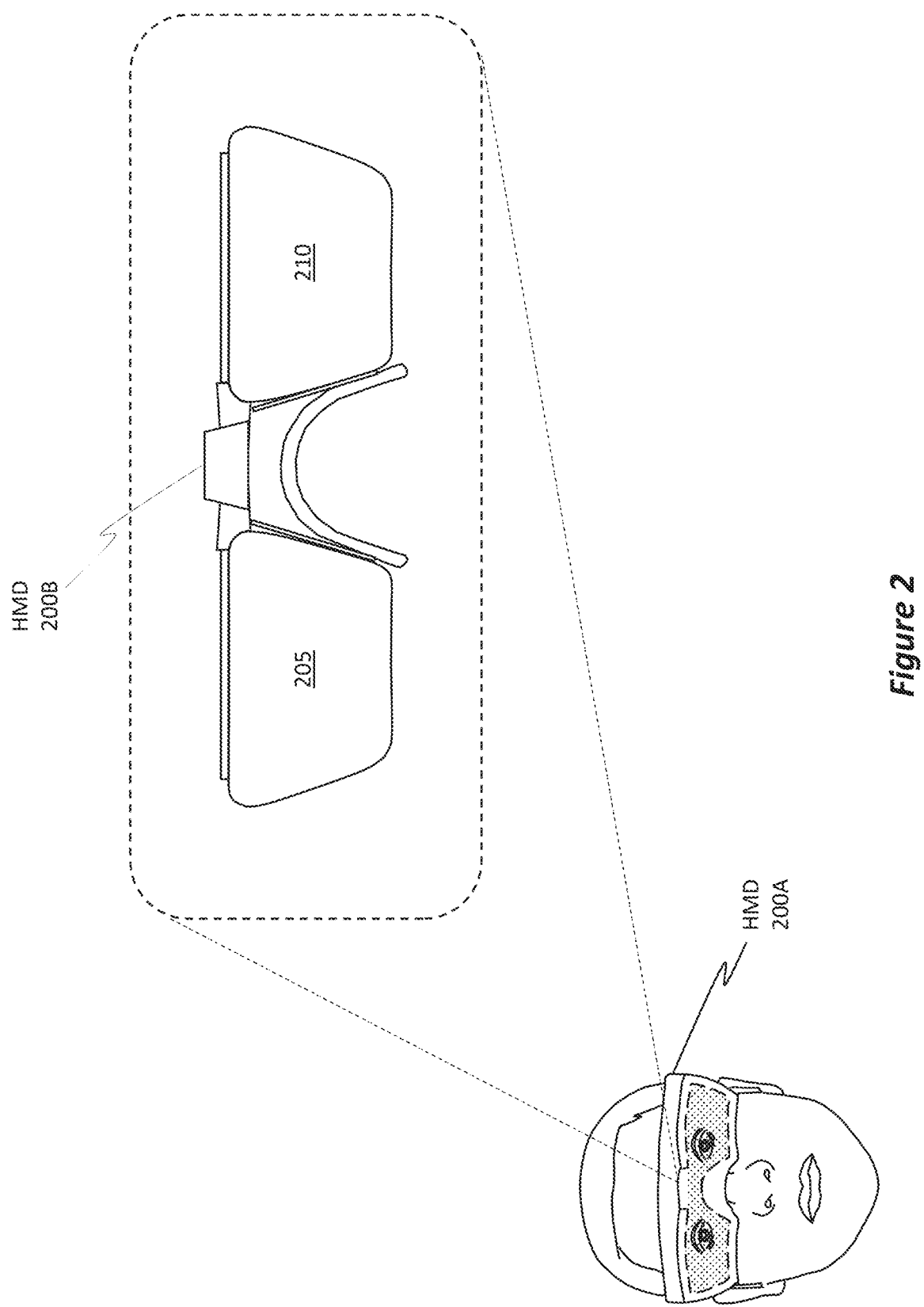
FIG. 2 illustrates an example of an HMD.

Turning briefly to FIG. 2, HMDs 200A and 200B are shown, where these HMDs are representative of the XR system 110 of FIG. 1. HMD 200B includes a left display 205, and a right display 210. HMD 200B is thus configured to provide binocular vision to the user. That is, HMD 200B displays a first image in the left display 205 and a second, different image in the right display 210. The user will view these two separate images, and the user's mind can fuse them, thereby allowing the user to perceive depth with respect to the holograms.

Figure 3:
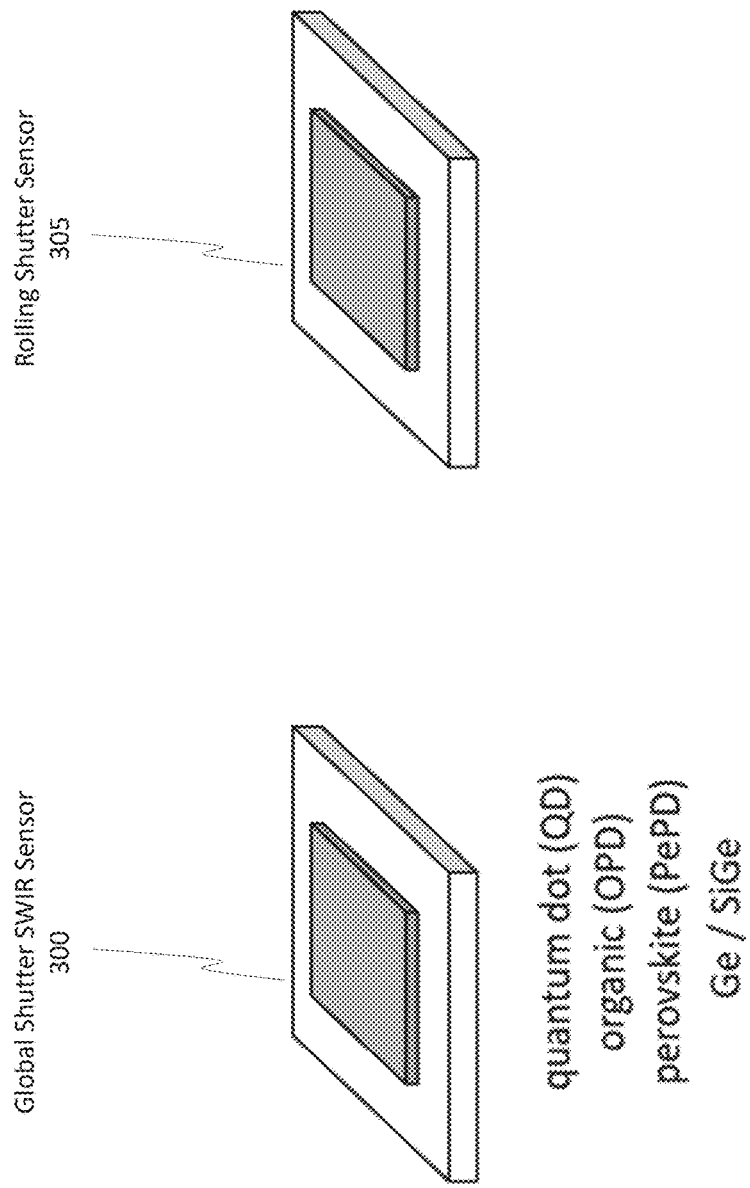
FIG. 3 illustrates various examples of global shutter sensors and rolling shutter sensors.

Returning to FIG. 1, service 105 is also shown as including or being associated with sensor(s) 125. FIG. 3 provides more detail.

FIG. 3 shows a global shutter SWIR sensor 300. This type of sensor can be implemented in a variety of ways. For instance, this sensor 300 can be implemented as a quantum dot sensor, an organic sensor, a perovskite sensor, a germanium sensor, or a silicon germanium sensor. Indeed, any type of colloidal quantum dot sensor can be used or any type of global shutter sensor. FIG. 3 also shows a rolling shutter sensor 305, which should also be included among the sensor(s) 125 of FIG. 1. When a specific call-out is made to a global shutter sensor, it should be appreciated how the details associated with that call-out (e.g., one particular example being the process flows) can also be attributed with the rolling shutter sensor.

Returning to FIG. 1, sensor(s) 125 are often configured to operate in one of at least two mode(s) 130. Notably, sensor (s) 125 operate using a frequency 125A, a resolution 125B, and an exposure time 125C (and corresponding non-exposure time). While operating in the first mode, the frequency 125A, resolution 125B, and exposure time 125C are set to first values. On the other hand, when the sensor(s) 125 are operating in the second mode, the frequency 125A, resolution 125B, and exposure time 125C are set to second values that are different than the first values. The first mode can be viewed as a passive mode in which no laser pulses have yet been detected, but the sensor(s) 125 are being used in a periodic manner to passively detect pulses. The second mode can be viewed as an active mode in which a laser pulse has been detected and the sensor(s) 125 are now being used to capture the entire period of the laser pulses. Further details on these aspects will be provided shortly.

Service 105 is tasked with triggering the generation of an analysis of a set of images 135. Service 105 analyzes these images 135 in an attempt to determine whether a laser pulse(s) 140 can be detected within those image 135. It may be the case that the laser pulse(s) 140 are not occurring for a period of time and thus are not detectable. After the laser pulse(s) 140 starts, images of those pulses can be acquired, and service 105 can analyze those images. It should be noted how the image 135 is generated by the sensor(s) 125. Any number of images may be generated.

After the laser pulse(s) 140 are first detected in the images, service 105 causes the sensor(s) 125 to transition from operating in the first mode to operating in the second mode. In particular, service 105 causes the sensor(s) 125 to increase the frequency 125A, to reduce the resolution 125B by reading out only a specific portion or number of pixels (e.g., a so-called "region of interest" (ROI)), and to decrease the exposure time 125C. Such operations are performed in an effort to ensure that an entire period of the laser pulse(s) 140 can be represented within the images.

Service 105 then extracts the frequency characteristics of the laser pulse(s) 140 by analyzing the images. After the frequency characteristics are determined, service 105 triggers a pulse decoding 145 operation to decode the embedded signal. The result of the pulse decoding 145 is an output 150 representative of the embedded signal. A more detailed example will be helpful. FIGS. 4-15 provide additional examples and explanations.

Figure 4:
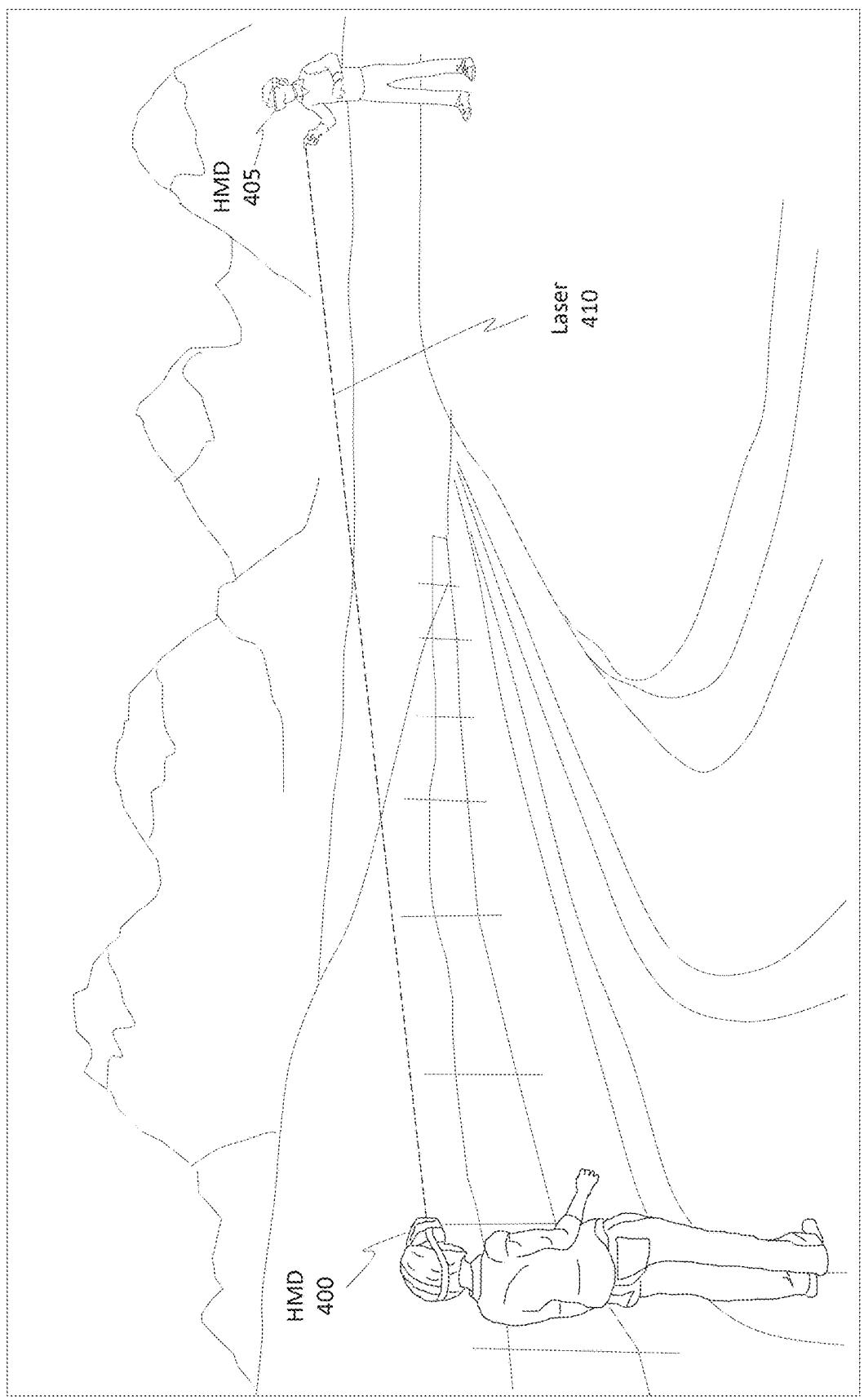
FIG. 4 illustrates an example scenario in which a laser signal is being emitted.

FIG. 4 shows an example scenario involving two HMDs, namely, HMD 400 and HMD 405. In this scenario, the user of HMD 405 is using a laser to transmit pulses to the HMD 400, which is the receiving HMD.

Figure 5:
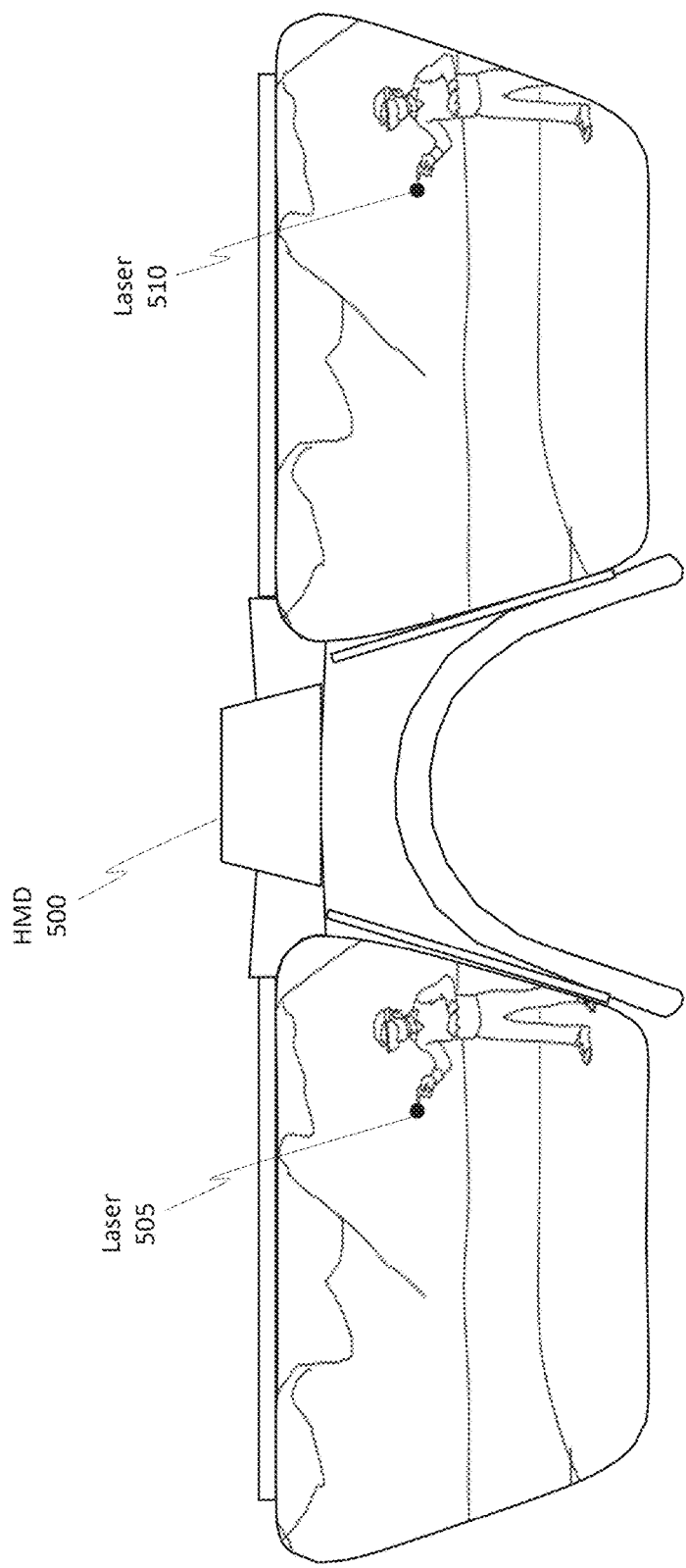
FIG. 5 illustrates how the laser signal can be captured by the HMD.

FIG. 5 shows an HMD 500, which corresponds to HMD 400 of FIG. 4. In particular, HMD 500 is the receiving HMD. Notice, FIG. 5 shows two images on the displays. Laser 505 and laser 510 correspond to the laser 410.

Figure 6:
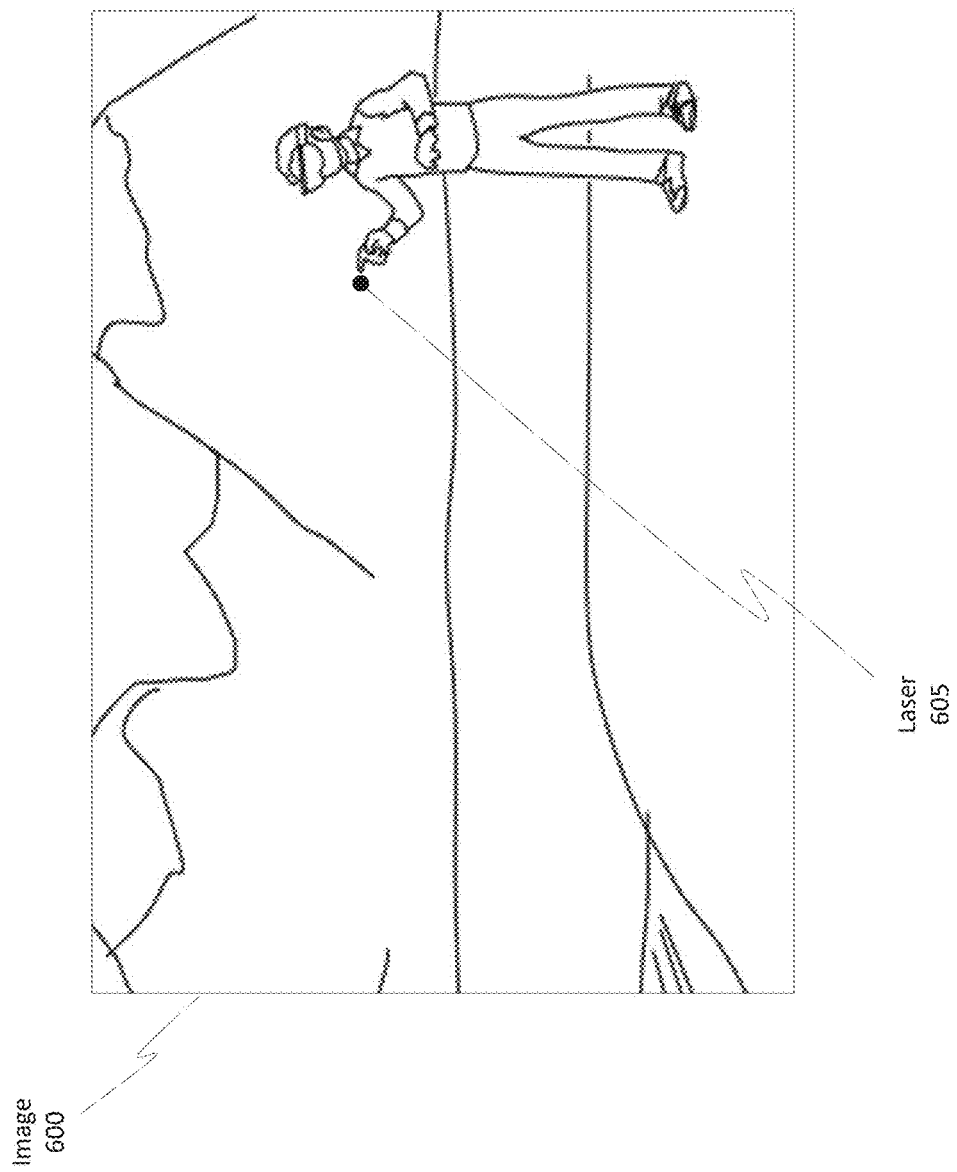
FIG. 6 illustrates an image showing a laser dot for the laser signal.

Service 105 from FIG. 1 is able to use its sensor(s) 125 to generate images of its environment. Initially, the sensor(s) 125 operate in a passive mode. Service 105 causes those sensor(s) 125 to operate in an active mode in response to detecting a laser in the images generated by the sensor(s) 125. FIG. 6 shows a first image 600 in which laser 605 light (e.g., a laser dot) is detected. In response to this detection, service 105 transitions the sensor(s) 125 to operate in the enhanced or active mode in order to capture an entire period of the laser's pulsed signal.

While in this active mode, the sensor(s) 125 capture images at an increased frequency. The sensor(s) 125 also reduce their exposure times. Additionally, the sensor(s) reduce the number of pixels they readout, thereby modifying or reducing the resolutions of the resulting images.

Figure 7:
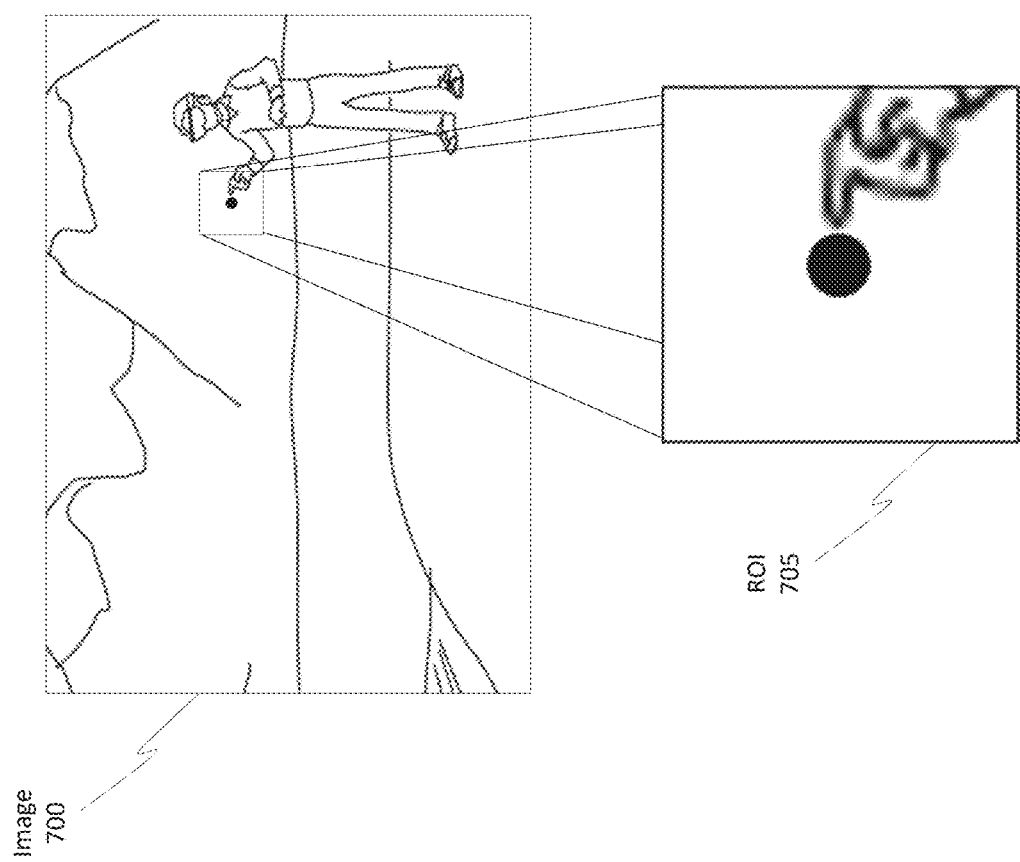
FIG. 7 illustrates a region of interest (ROI).

Regarding the resolutions, FIG. 7 is illustrative. FIG. 7 shows an initial image 700 in which laser light is detected. This initial image 700 is a full scale full resolution image.

After the laser light is detected, the embodiments identify pixel coordinates in the image 700, where those pixel coordinates correspond to pixels representative of the laser light. The embodiments also select a buffer region around the detected laser light. The buffer region may be a select number of pixels surrounding the detected laser dot. The number of pixels may be 1, 2, 3, 4, 5, 6, 7, 8, 9, 10 or more than 10 pixels above, below, and/or to the sides of the detected laser dot.

The embodiments then cause the sensor(s) to read out only the pixels corresponding to the laser light and those pixels included in the buffer. This group of pixels (i.e. the laser light pixels and the buffer pixels) is referred to as the ROI, as shown by ROI 705.

Optionally, various motion compensation operations can be performed if a movement of the sensor(s) and/or of the laser light is detected. This motion compensation is performed in an effort to ensure that the laser light is properly and fully read out by the sensor(s). In particular, the motion compensation is performed to ensure that the laser light is adequately represented within the smaller ROI that is read out by the sensor(s). By way of example, in FIG. 7, suppose the user's hand shifted to the left. This shift can be detected, and the embodiments are able to perform motion compensation in an effort to keep the detected laser light generally in the center of the ROI 705. The motion compensation can be performed using data obtained from an inertial measurement unit (IMU).

Example Process Flow

Figure 8:
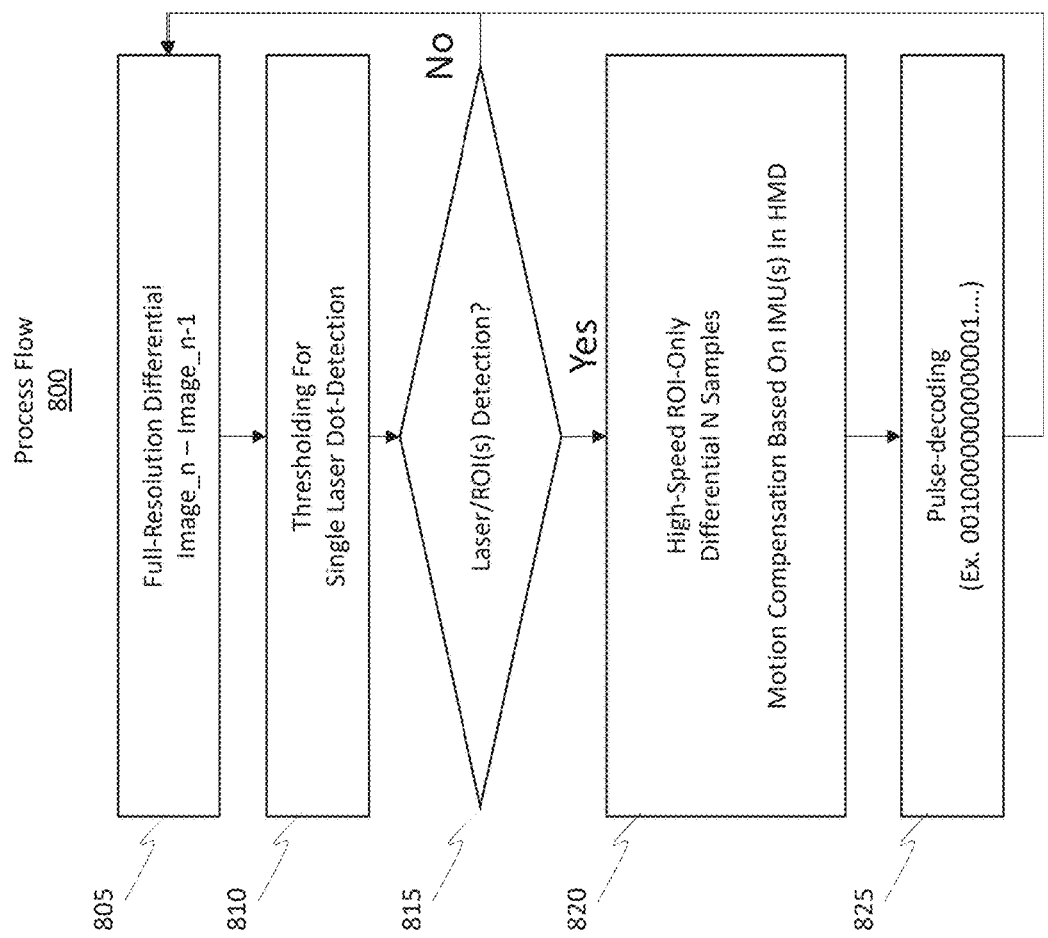
FIG. 8 illustrates an example process flow for facilitating a decoding operation.

FIG. 8 shows an example process flow 800 describing some of the actions at a high level. Process flow 800 includes a step 805 of obtaining different images in an attempt to identify a laser pulse. These images are full resolution images. The embodiments take a differential between one image (e.g., image_n) and a second image (e.g., image_n−1). This differential will be used to determine whether a laser pulse is present.

Step 810 then involves analyzing the differential to determine whether the laser pulse is present. The embodiments may establish a threshold with respect to pixel intensity values to determine a single laser dot has been detected.

Step 815 is then a decision block. If no laser dot is detected, then process flow 800 returns to step 805. If a laser dot is detected, then the process flow 800 continues to step 820.

Notably, the embodiments can operate to detect any number of laser dots, and the disclosed principles are not limited to detecting only a single laser dot. Indeed, 1, 2, 3, 4, 5, or more than 5 laser dots can be detected within a given frame. These laser dots may originate from other HMDs in the environment. Similarly, the embodiments are able to generate any number of ROIs based on the detected number of laser dots. For instance, if 5 laser dots are detected in an image, the embodiments are able to generate 5 ROIs corresponding to 5 HMDs in the environment.

Step 820 involves performing motion compensation if the laser dots are determined to be moving or if the sensors on the receiving HMD are determined to be moving. This motion compensation can be performed using data from an inertial measurement unit (IMU) located on the HMD.

A sufficient number of ROI images are generated so as to capture the entire period of the laser pulse signal. Once the period is known, those images can be analyzed to detect the frequency component, such as via use of a fast Fourier transform. After the frequency component is known, then step 825 involves performing a pulse-decoding operation to derive the embedded message or data in the laser pulse. Process flow 800 can then repeat itself.

Sensor Usage Scenarios

FIGS. 9, 10, 11, 12, 13, 14, and 15 illustrate various scenarios and supporting illustrations related to different types of global shutter sensors. In particular, the GS sensors described in FIGS. 9, 10, and 11 can operate in various modes. A first mode is illustrated in FIGS. 12, 13, 14, and 15. This first mode enables the GS sensor to detect a laser pulse. A second mode is generally illustrated by the flow diagram of FIG. 16. This second mode enables the GS sensor to decode the frequency. The disclosed embodiments can operate using any of these types. For instance, the embodiments can operate using a progressive timing type of GS sensor. The embodiments can also operate using a non-progressive timing type of GS sensor.

Figure 9:
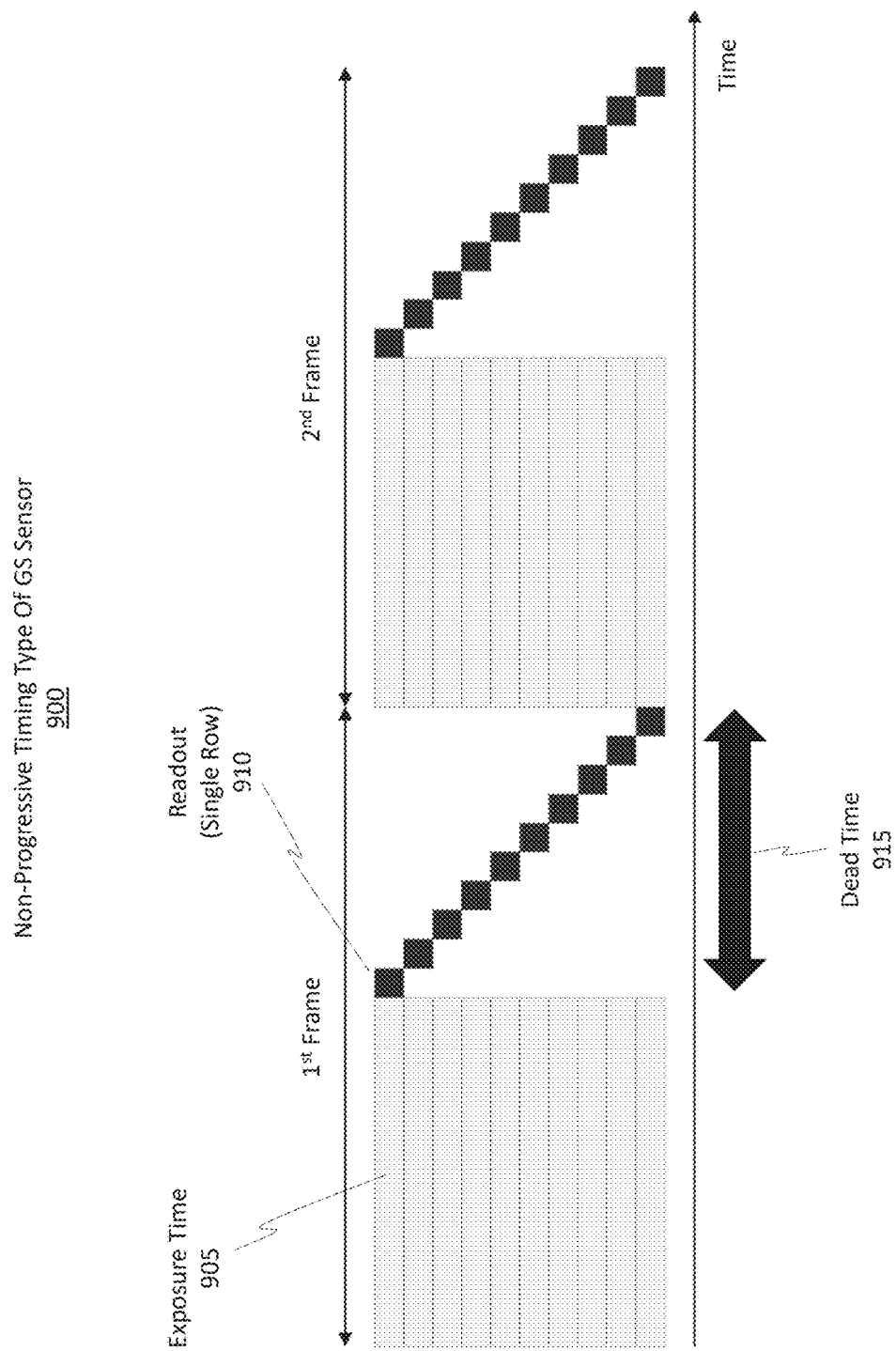
FIG. 9 illustrates a non-progressive timing scheme for a sensor.

FIG. 9 shows an example of a non-progressive timing type of GS shutter 900. FIG. 9 specifically shows the readout for two different frames (e.g., 1$^{st}$ frame and 2$^{nd}$ frame). FIG. 9 shows an exposure time 905 for the 1$^{st}$ frame and a readout 910 of a single row for that frame. FIG. 9 also shows dead time 915 that exists between the complete readout of the 1$^{st}$ frame and the start of the readout for the 2$^{nd}$ frame.

Figure 10:
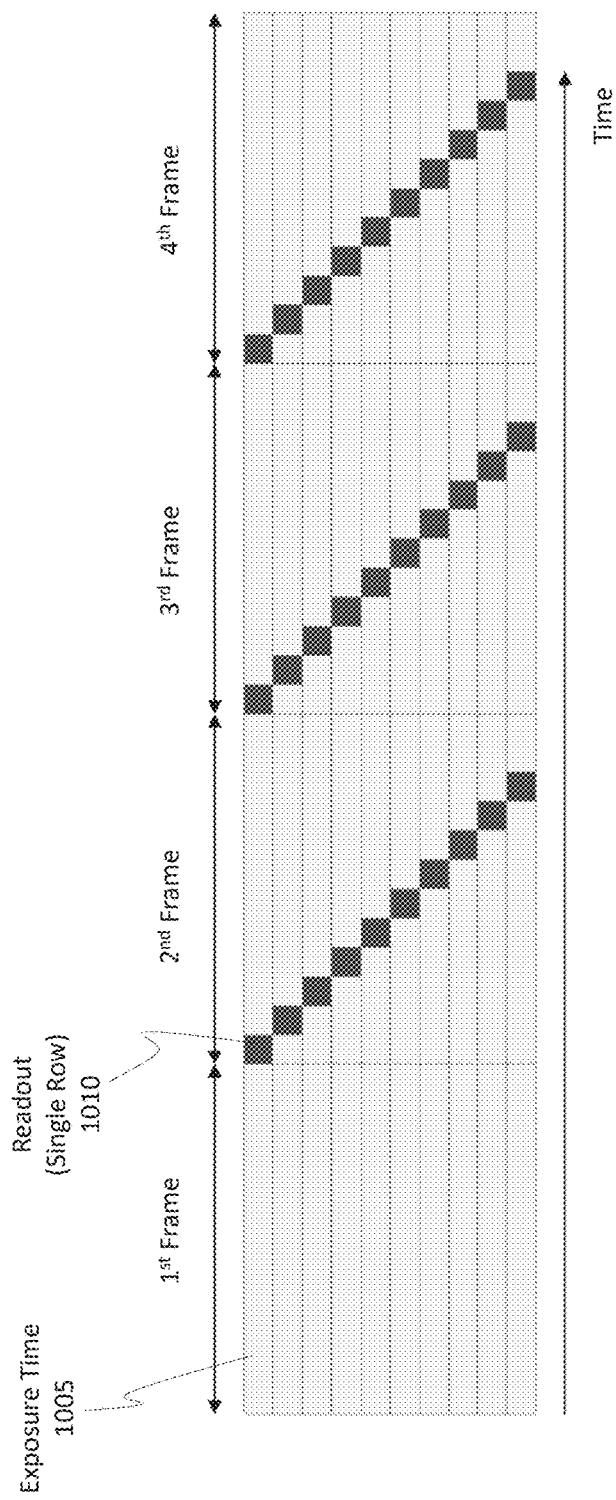
FIG. 10 illustrates a progressive timing scheme for a sensor.

FIG. 10, on the other hand, shows a progressive timing type of GS shutter 1000. FIG. 10 shows the readouts for four frames, namely, 1$^{st}$ frame, 2$^{nd}$ frame, 3$^{rd}$ frame, and 4$^{th}$ frame.

FIG. 10 shows the exposure time 1005 for the 1$^{st}$ frame. The readout 1010 is also shown. Notice, the readout for the prior frame can occur during the exposure time for the subsequent frame. Performing the exposure and readout in this manner helps eliminate the dead time 915 of FIG. 9.

If progressive GS timing that can offer 100% duty-cycle exposure time is available, then the process flow 800 of FIG. 8 can be implemented directly.

If only non-progressive GS timing that has <100% duty-cycle exposure time is available, then the embodiments modify the procedure of FIG. 8 by additionally determining the exposure time of full-resolution images for laser pulse repetition rate range/resolutions. The details are in FIGS. 11 through 15.

Figure 11:
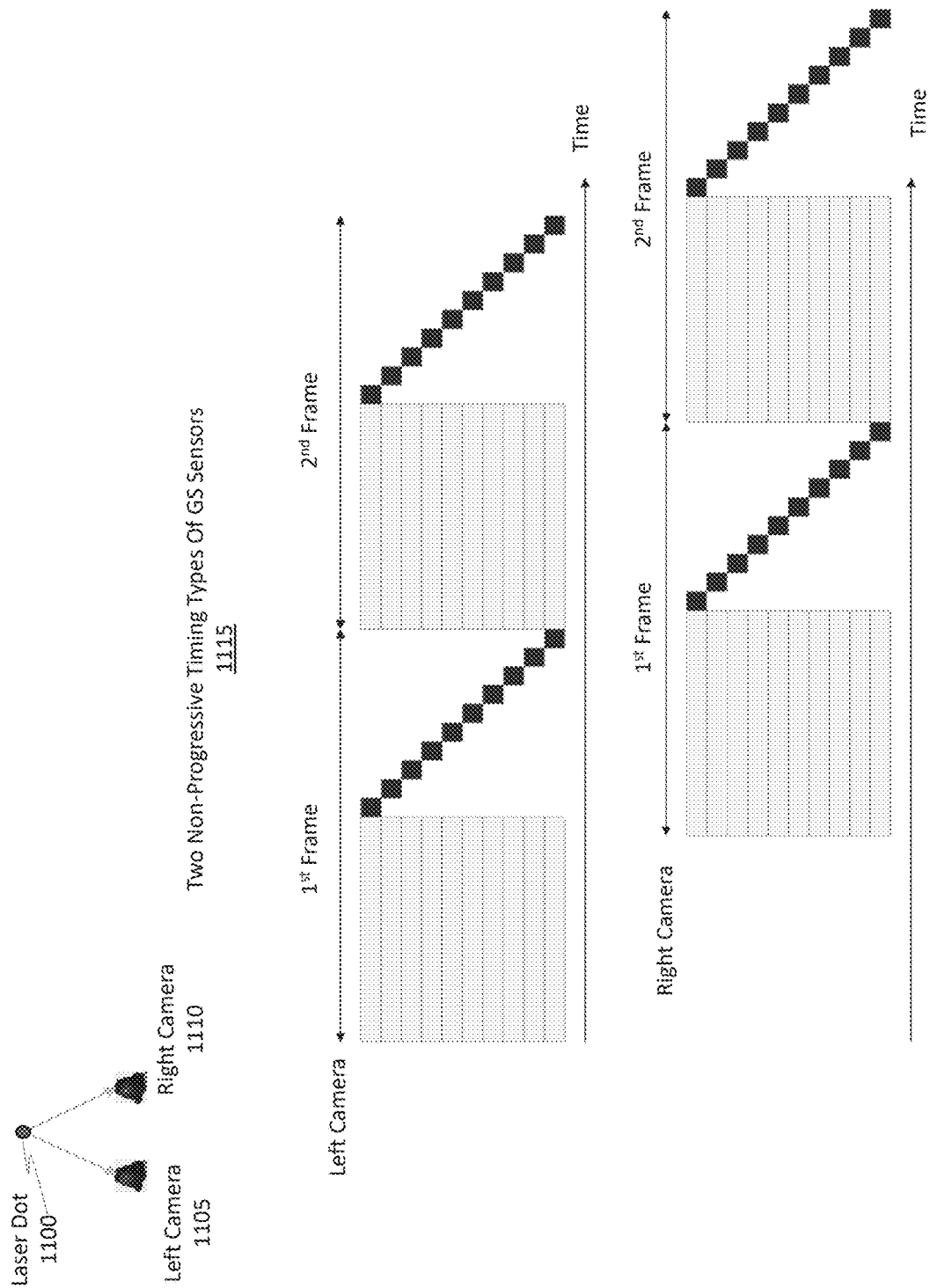
FIG. 11 illustrates another non-progressive timing scheme.

FIG. 11 shows a laser dot 1100 that is detected by a left camera 1105 and a right camera 1110. FIG. 11 further shows two non-progressive timing types of GS sensors 1115. The illustrations in FIG. 11 include a readout for the left camera and a readout for the right camera.

Notice, the exposure time for the right camera overlaps a readout time for the left camera. For instance, the exposure time for the right camera either starts before the exposure time for the left camera ends or starts right when the readout for the left camera begins.

Similarly, the exposure time for the right camera ends either right when the readout for the left camera ends or ends shortly after the exposure time for the left camera begins. Of course, the left and right camera readouts and exposures can be reversed.

In the scenario involving two non-progressive timing type GS cameras, alternating exposure times can enable 100% duty cycle, as shown in FIG. 11. As an added benefit, if a stereo vision algorithm is used, then the embodiments can use stereoscopic depth measurements (from the obtained stereoscopic images obtained from the left and right cameras) to determine the range to laser that emitted the laser dot. In some embodiments, two or more laser dots can be tracked and decoded. Furthermore, occlusions can be mitigated.

Figure 12:
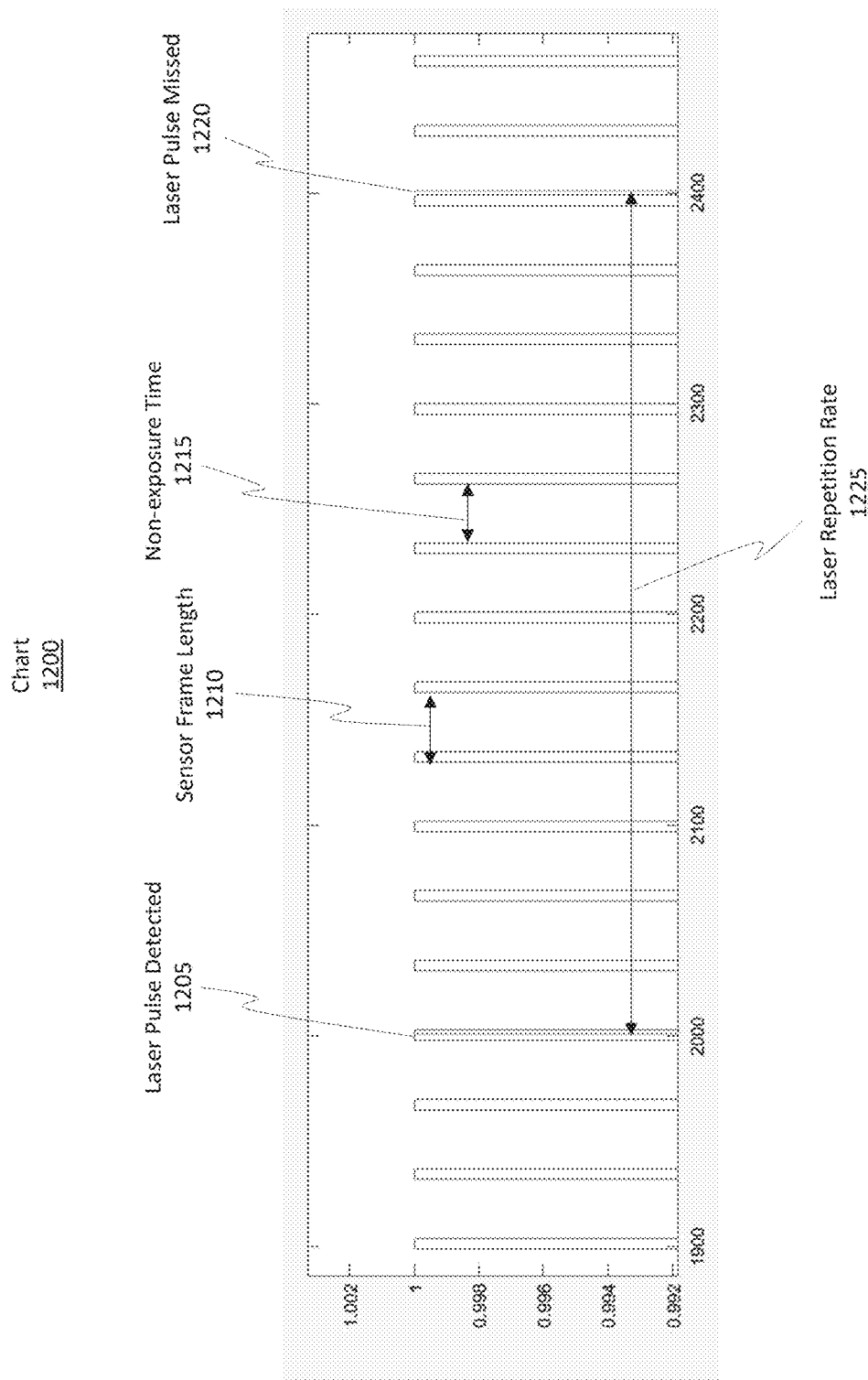
FIG. 12 illustrates a chart of detected laser signals.

FIG. 12 shows an example chart 1200 that includes various laser pulses, as detected within the captured images. FIG. 12 shows an example laser pulse detected 1205, a sensor frame length 1210, a non-exposure time 1215, a laser pulse missed 1220, and a laser repetition rate 1225. These various metrics can be derived from the acquired images. In this example, the non-exposure time is 13.45 ms.

In the example scenario of FIG. 12, the laser repetition rate is 1:0.1:5 Hz. The number of laser pulses is 60. The laser pulse width is 0.5 ms. The pulse detection probability is the number of frames that captures laser pulses divided by the total number of laser pulses.

Figure 13:
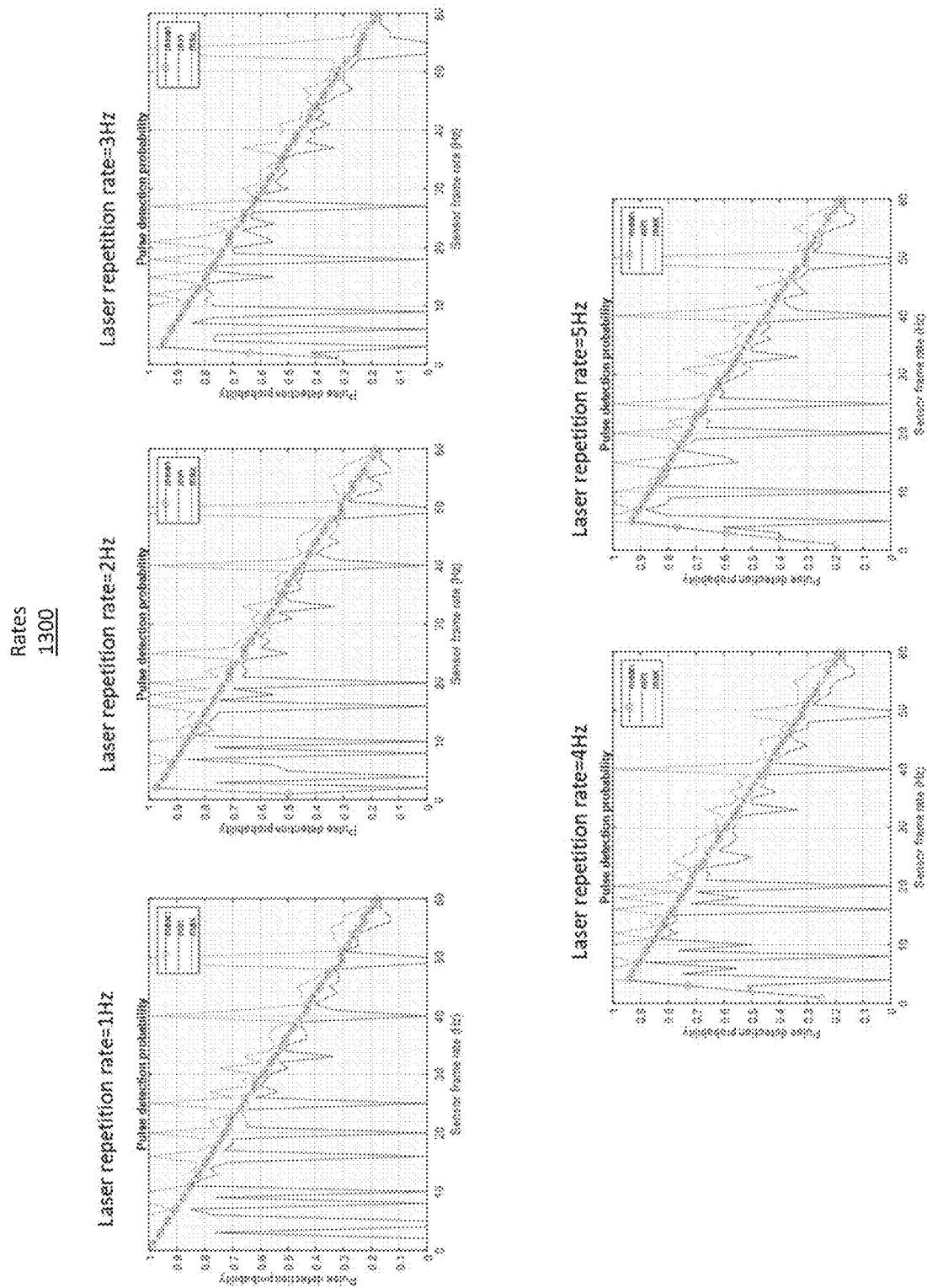
FIG. 13 illustrates various pulse rates for laser signals.
Figure 14:
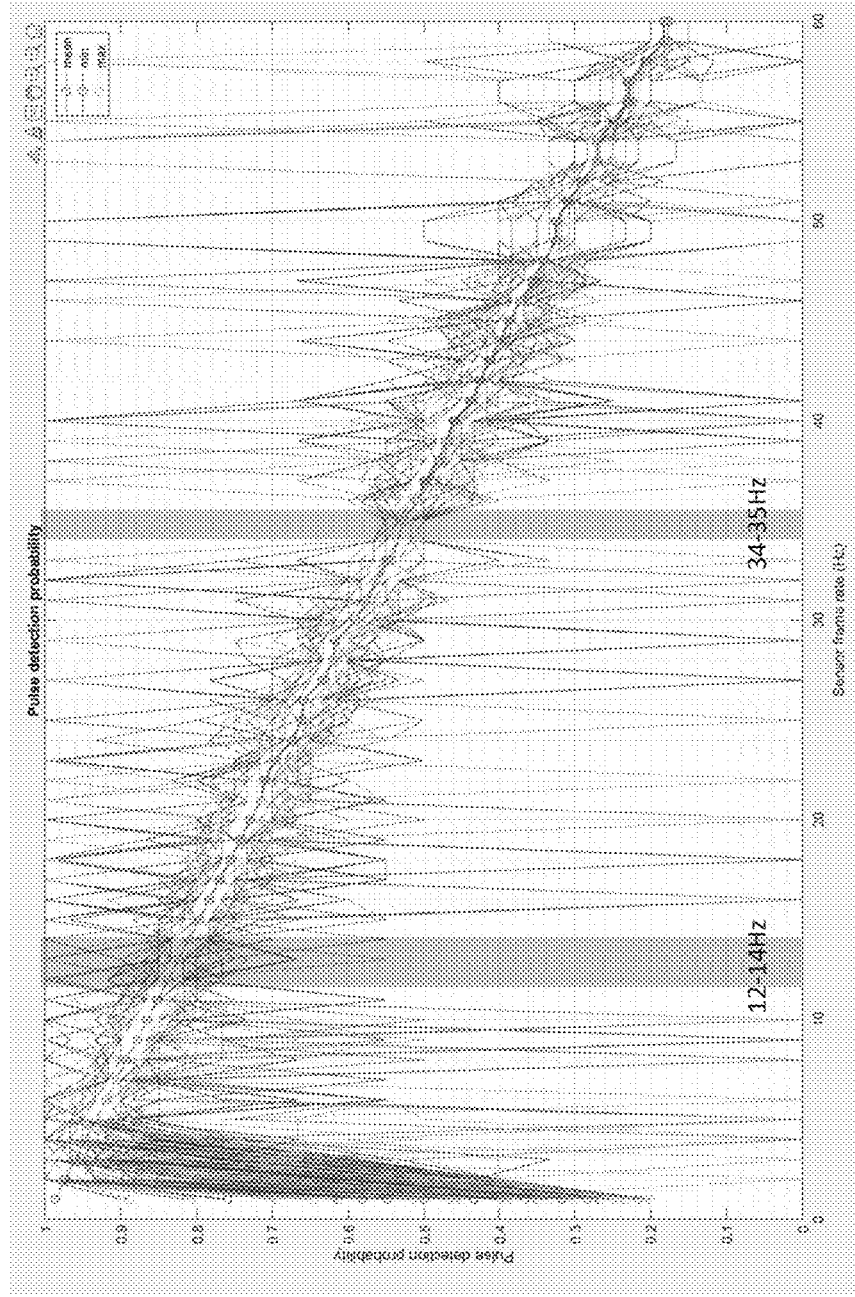
FIG. 14 illustrates a full-resolution frame rate.

FIG. 13 illustrates various charts showing different pulse rates 1300. For instance, the following pulse rates are shown: 1 Hz, 2 Hz, 3 Hz, 4 Hz, and 5 Hz. FIG. 14 illustrates an optimization of full-resolution frame rate 1400 with a laser repetition rate of 1:01:5 Hz. By way of further detail, FIGS. 13 and 14 include information plotted for each sensor frame rate. This information includes the min/mean/max pulse detection probability over all the laser repetition rates. An optimal full-resolution frame rate can be selected that balances having higher mean pulse detection probability with also having higher min pulse detection probability.

Figure 15:
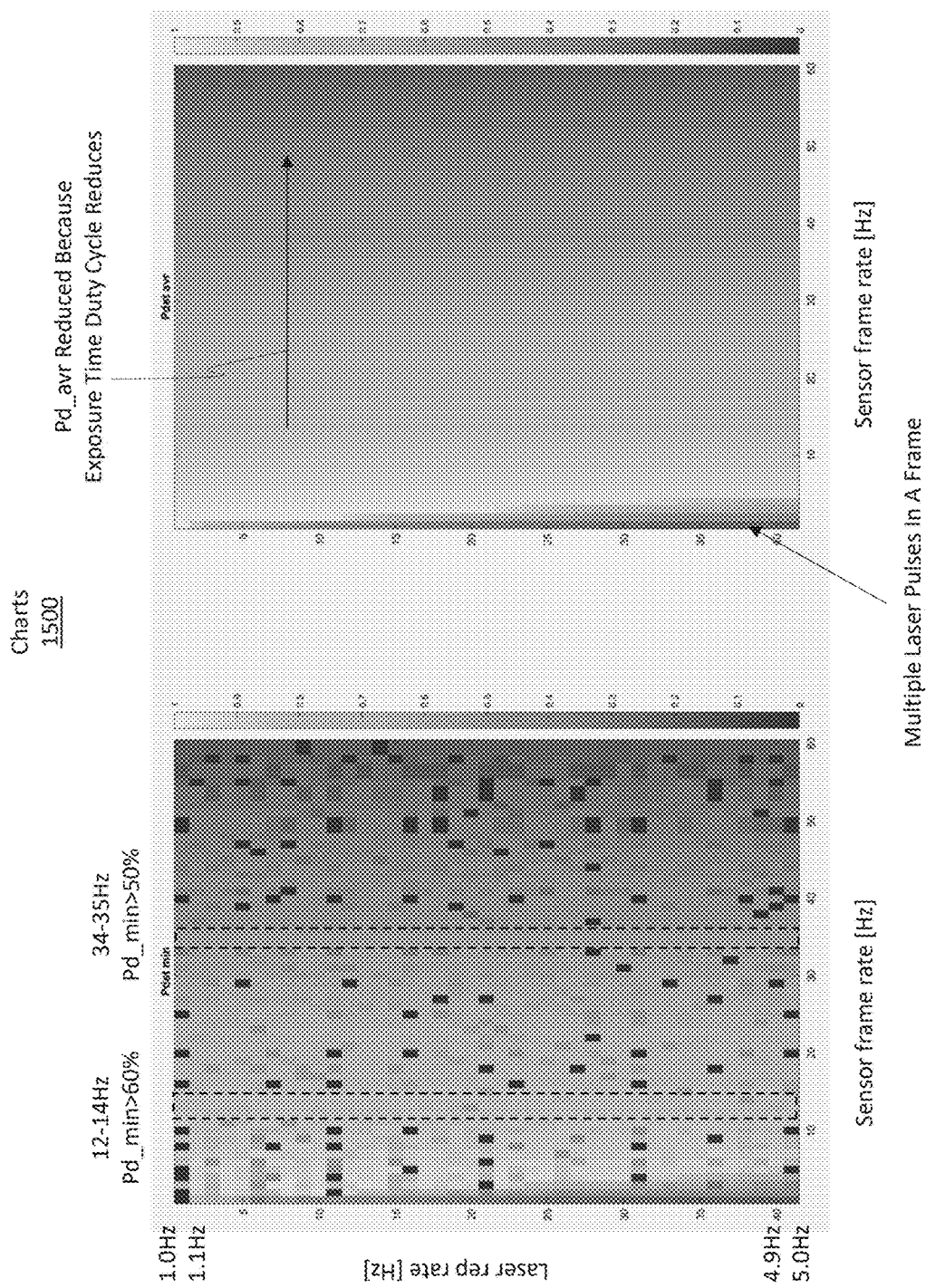
FIG. 15 illustrates various aspects related to laser pulses.

FIG. 15 shows some additional charts 1500 that reflect the optimization of full-resolution frame rates, and FIG. 15 is similar to FIG. 14 but provides a different visualization of the data. Using the information described in FIGS. 11, 12, 13, 14, and 15, the embodiments are able to implement a non-progressive timing type GS sensor routine.

Returning to FIG. 1, the sensor(s) 125 thus include any type of global shutter sensor. Examples of these global shutter sensors include quantum dot (QD) sensors, organic (OPD) sensors, perovskite (PePD) sensors, germanium (Ge) sensors, silicon germanium (SiGe) sensors, or any type of colloidal quantum sensor.

With this type of sensor, the sensor(s) 125 can now consume only about 100 mW of power, making their use on the XR system 110 now very workable. The sensor(s) 125's pixel pitch is very small because the sensor(s) 125 no longer need a per pixel ADC. For example, the pixel pitch is now between about 2 um and 5 um in size. In some implementations, the pixel pitch can even be lower than 2 um. Regarding the resolution 125B, the resolution 125B is between about 2 megapixels and about 5 megapixels. The output of the global shutter sensor is a two dimensional (2D) image. This image is used to capture the laser pulse.

Once the images are obtained, then the embodiments can extract the frequency characteristics. The embodiments then use those frequency characteristics to perform a decoding operation in order to extract the data of the embedded signal. Accordingly, the disclosed embodiments are able to perform laser pulse decoding operations using a global shutter sensor.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 16:
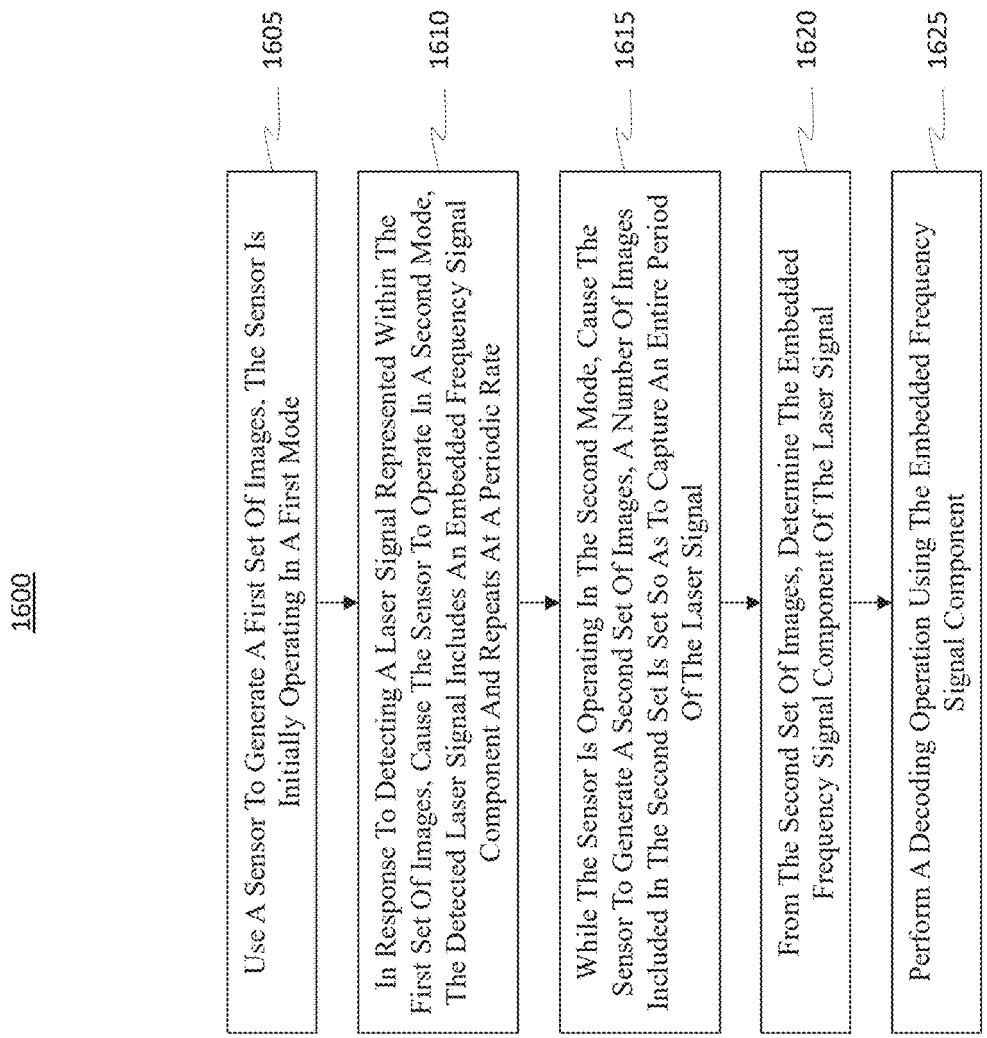
FIG. 16 illustrates a flowchart of an example method for using a sensor to decode a laser signal.

Attention will now be directed to FIG. 16, which illustrates a flowchart of an example method 1600 for using a sensor to facilitate a decoding operation. This sensor can be a global shutter (GS) sensor or a rolling shutter sensor. Method 1600 focuses on an example involving the GS sensor, but one will appreciate how a rolling shutter can also be used in each of the example scenarios recited below. Method 1600 can be implemented within the architecture 100 of FIG. 1; furthermore, method 1600 can be performed by service 105 of FIG. 1. Even further, method 1600 can be performed by the XR system 110.

In some implementations, the GS sensor is a progressive timing type of GS sensor. In some other implementations, the GS sensor is a non-progressive timing type of GS sensor. In some scenarios, the power consumption of the GS sensor is less than about 100 milliwatts; the GS sensor omits an analog to digital converter (ADC) per pixel on the GS sensor; the pixel pitch of the GS sensor is between about 2 microns and about 5 microns; and the resolution of the GS sensor can be between about 2 megapixels and about 5 megapixels, though a lower resolution can be used when an ROI is involved.

Method 1600 includes an act (act 1605) of using a global shutter (GS) sensor (e.g., sensor(s) 125 of FIG. 1) to generate a first set of images. The GS sensor is initially operating in a first mode while collecting these images.

In response to detecting a laser signal represented within the first set of images, act 1610 includes causing the GS sensor to operate in a second mode. Often, the laser signal will be included in the last image within this first set of images. That is because the detection of the laser signal will trigger the embodiments to cause the GS sensor to transition from operating in the first mode to operating in the second mode.

The laser signal includes an embedded frequency signal component and repeats at a periodic rate. In some cases, the pulse rate of the laser signal is less than about 5 Hz.

The GS sensor, when operating in the first mode, has a frame rate between about 10 Hz and about 60 Hz (or, more generally, between 1 Hz and 240 Hz), generates full resolution images, and has a non-exposure time of approximately 13 milliseconds. The GS sensor, when operating in the second mode, has a frame rate that is at or above 250 Hz (or, more generally, at or above 60 Hz), generates reduced resolution images (e.g., a 100 pixel by 100 pixel resolution image), and has a non-exposure time that is less than 1 millisecond. More generally, the sensor, when operating in the second mode, has a non-exposure time that is less than a non-exposure time of the sensor when it is operating in the first mode. In some cases, the reduced resolution image is any resolution that is less than about 500 pixels by 500 pixels.

While the GS sensor is operating in the second mode, act 1615 includes causing the GS sensor to generate a second set of images. The number of images included in the second set of images is set so as to capture an entire period of the laser signal, which repeats at the periodic rate. Stated differently, the number of images in the second set is set so an entire period of the laser signal is fully represented within those images. It may be the case that additional images are included in this second set.

Thus, in some scenarios, the GS sensor, when operating in the second mode, (i) has an increased frame rate relative to a frame rate of the GS sensor when operating in the first mode, (ii) produces images that have reduced resolutions relative to resolutions of images produced by the GS sensor when operating in the first mode (e.g., because of the ROI factor), and (iii) has a reduced non-exposure time relative to a non-exposure time of the GS sensor when operating in the first mode.

Optionally, the process of detecting the laser signal is performed via a differential operation between a preceding image and a succeeding image. This differential operation may involve subtracting all the pixels included in one image from pixels included in the second image. The remaining pixels represent new content, which might potentially correspond to a laser dot. In some cases, machine learning image segmentation and recognition is performed to detect the laser dot or laser signal. Use of the machine learning can be performed as an alternative to or as an addition to the differential operation.

Act 1620 then includes determining, from the second set of images, the embedded frequency signal component of the laser signal. This act may involve the use of a fast Fourier transform to determine the frequency component.

Act 1625 includes performing a decoding operation using the embedded frequency signal component. Optionally, the decoding operation may be a short-wave infrared (SWIR) asynchronous laser pulse detection (ALPD) type of decoding operation.

Optionally, method 1600 may include an act of triggering emission of a response laser signal. A response embedded frequency signal component can be embedded in the response laser signal. The response laser signal may be configured to repeat at a second periodic rate. Furthermore, the content of the embedded frequency signal component may be based on the received embedded frequency signal component.

Example Computer/Computer Systems

Figure 17:
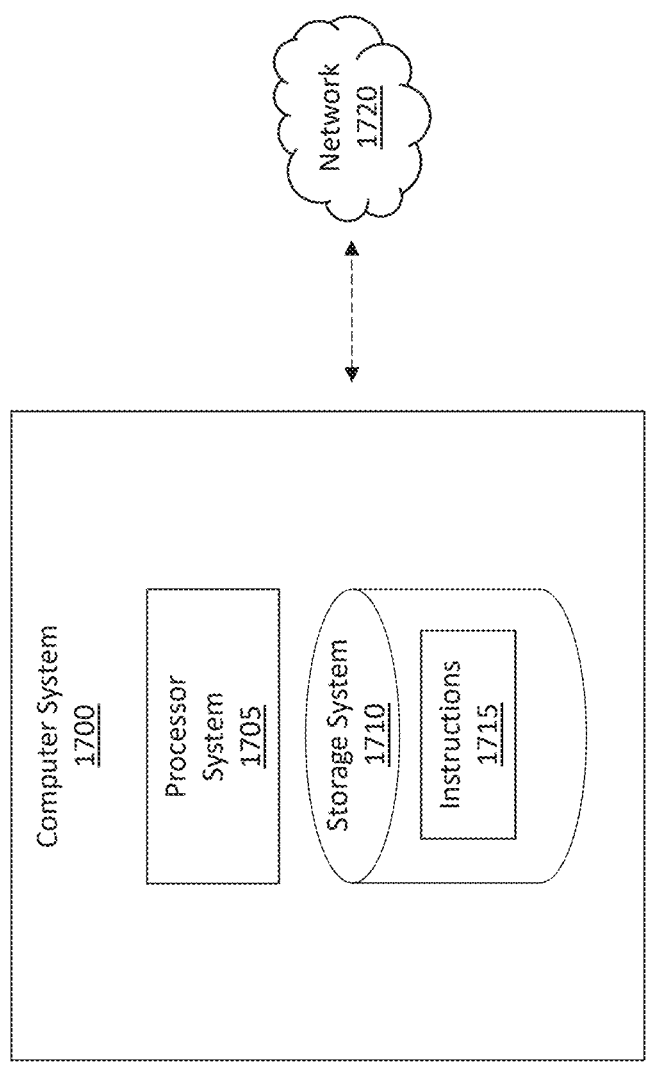
FIG. 17 illustrates an example computer system that can be configured to perform any of the disclosed operations.

Attention will now be directed to FIG. 17 which illustrates an example computer system 1700 that may include and/or be used to perform any of the operations described herein. For instance, computer system 1700 can implement architecture 100 of FIG. 1 and/or the service 105. Similarly, computer system 1700 can be in the form of the XR system 110.

Computer system 1700 may take various different forms. For example, computer system 1700 may be embodied as a tablet, a desktop, a laptop, a mobile device, or a standalone device, such as those described throughout this disclosure. Computer system 1700 may also be a distributed system that includes one or more connected computing components/devices that are in communication with computer system 1700.

In its most basic configuration, computer system 1700 includes various different components. FIG. 17 shows that computer system 1700 includes a processor system 1705 that includes one or more processor(s) (aka a "hardware processing unit") and a storage system 1710.

Regarding the processor(s) of the processor system 1705, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1700. The different components, modules, engines, and services described herein may be implemented as objects or processors that execute on computer system 1700 (e.g. as separate threads).

Storage system 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage system 1710 is shown as including executable instructions 1715. The executable instructions 1715 represent instructions that are executable by the processor(s) of computer system 1700 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks to remote/separate computer systems(s) that are configured to perform any of the processing described with regard to computer system 1700.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   a processor system; and
   a storage system that stores instructions that are executable by the processor system to cause the computer system to:
   use a sensor to generate a first set of images, wherein the sensor is initially operating in a first mode, and wherein the sensor is one of a global shutter sensor or a rolling shutter sensor;
   in response to detecting a laser signal represented within the first set of images, cause the sensor to operate in a second mode, wherein the laser signal includes an embedded frequency signal component, and wherein the laser signal repeats at a periodic rate;
   while the sensor is operating in the second mode, cause the sensor to generate a second set of images, wherein a number of images included in the second set of images is set so an entire period of the laser signal is represented within the second set of images;
   from the second set of images, determine the embedded frequency signal component of the laser signal; and
   perform a decoding operation using the embedded frequency signal component.

2. The computer system of claim 1, wherein the sensor, when operating in the first mode, has a frame rate between about 1 Hz and about 240 Hz.

3. The computer system of claim 1, wherein the sensor, when operating in the first mode, generates full resolution images.

4. The computer system of claim 1, wherein the sensor is the rolling shutter sensor.

5. The computer system of claim 1, wherein the sensor, when operating in the second mode, has a frame rate at or above 60 Hz.

6. The computer system of claim 1, wherein the sensor, when operating in the second mode, generates reduced resolution images.

7. The computer system of claim 1, wherein the sensor is the global shutter sensor.

8. The computer system of claim 1, wherein the sensor, when operating in the second mode, has a non-exposure time that is less than a non-exposure time of the sensor when the sensor is operating in the first mode.

9. The computer system of claim 1, wherein detecting the laser signal is performed via a differential operation between a preceding image and a succeeding image.

10. The computer system of claim 1, wherein the sensor is a colloidal quantum dot sensor.

11. The computer system of claim 1, wherein the sensor, when operating in the second mode, (i) has an increased frame rate relative to a frame rate of the sensor when operating in the first mode, (ii) produces images that have reduced resolutions relative to resolutions of images produced by the sensor when operating in the first mode, and (iii) has a reduced non-exposure time relative to a non-exposure time of the sensor when operating in the first mode.

12. The computer system of claim 1, wherein the sensor is a progressive timing type of sensor.

13. The computer system of claim 1, wherein the sensor is a non-progressive timing type of sensor.

14. The computer system of claim 1, wherein the decoding operation is a short-wave infrared (SWIR) asynchronous laser pulse detection (ALPD) type of decoding operation.

15. The computer system of claim 1, wherein a power consumption of the sensor is less than about 100 milliwatts, wherein the sensor omits an analog to digital converter (ADC) per pixel on the sensor, wherein a pixel pitch of the sensor is between about 2 microns and about 5 microns, and wherein a resolution of the sensor is between about 2 megapixels and about 5 megapixels.

16. A method comprising:
using a sensor to generate a first set of images, wherein the sensor is initially operating in a first mode, and wherein the sensor is one of a global shutter sensor or a rolling shutter sensor;
in response to detecting a laser signal in the first set of images, causing the sensor to operate in a second mode, wherein the laser signal includes an embedded frequency signal component and repeats at a periodic rate;
while the sensor is operating in the second mode, causing the sensor to generate a second set of images, wherein a number of images included in the second set of images is set so as to capture an entire period of the laser signal, which repeats at the periodic rate;
from the second set of images, determining the embedded frequency signal component of the laser signal; and
performing a decoding operation using the embedded frequency signal component.

17. The method of claim 16, wherein the sensor is the global shutter sensor, and wherein the global shutter sensor is one of a quantum dot sensor, an organic sensor, a perovskite sensor, a germanium sensor, a silicon germanium sensor, or a colloidal quantum sensor.

18. The method of claim 16, wherein a pulse rate of the laser signal is less than about 5 Hz.

19. The method of claim 16, wherein the sensor, when operating in the second mode, has a non-exposure time that is less than a non-exposure time of the sensor when the sensor is operating in the first mode.

20. A method comprising:
using a sensor to generate a first set of images, wherein the sensor is initially operating in a first mode, and wherein the sensor is one of a global shutter sensor or a rolling shutter sensor;
in response to detecting a laser signal in the first set of images, causing the sensor to operate in a second mode, wherein the laser signal includes an embedded frequency signal component, and wherein the laser signal repeats at a periodic rate;
while the sensor is operating in the second mode, causing the sensor to generate a second set of images, wherein a number of images included in the second set of images is set so as to capture an entire period of the laser signal, which repeats at the periodic rate;
from the second set of images, determining the embedded frequency signal component of the laser signal;
performing a decoding operation using the embedded frequency signal component; and
triggering emission of a response laser signal, wherein a response embedded frequency signal component is embedded in the response laser signal, wherein the response laser signal repeats at a second periodic rate, and wherein a content of the embedded frequency signal component is based on the received embedded frequency signal component.

* * * * *